(12) United States Patent
Kuroda et al.

(10) Patent No.: US 6,757,126 B1
(45) Date of Patent: *Jun. 29, 2004

(54) MAGNETIC RECORDING MEDIUM HAVING TRACKING CONTROL AREA FORMED ADJACENT DATA TRACKS

(75) Inventors: Sumio Kuroda, Kawasaki (JP); Koichi Iida, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/293,552

(22) Filed: Apr. 16, 1999

(30) Foreign Application Priority Data

Apr. 22, 1998 (JP) .......................................... 10-112545

(51) Int. Cl.$^7$ .............................................. G11B 5/596
(52) U.S. Cl. .................................. 360/77.02; 360/78.04
(58) Field of Search .......................... 360/77.08, 77.02, 360/77.03, 328, 1.2, 294.4; 369/124, 278, 44.26, 44.34, 48, 275.3, 275.4

(56) References Cited

U.S. PATENT DOCUMENTS

| | | | |
|---|---|---|---|
| 4,027,330 A | * | 5/1977 | Maslowski et al. ......... 369/279 |
| 4,583,135 A | * | 4/1986 | Kimura ................ 360/294.4 X |
| 4,961,123 A | * | 10/1990 | Williams et al. ...... 360/77.03 X |
| 5,210,738 A | * | 5/1993 | Iwata et al. .............. 369/275.1 |
| 5,296,995 A | * | 3/1994 | Yonezawa et al. .......... 360/135 |
| 5,325,244 A | * | 6/1994 | Takano et al. ............ 360/77.03 |
| 5,377,178 A | * | 12/1994 | Saito et al. .................. 369/124 |
| 5,402,278 A | * | 3/1995 | Morita ................ 360/77.02 X |
| 5,537,282 A | * | 7/1996 | Treves et al. ........ 360/77.02 X |
| 5,844,882 A | * | 12/1998 | Yoshida et al. .......... 369/275.4 |
| 5,844,883 A | * | 12/1998 | Kanno et al. ............ 369/275.4 |
| 5,870,375 A | * | 2/1999 | Maeda et al. ............ 369/275.3 |
| 6,370,107 B1 | * | 4/2002 | Hosaka et al. ........... 369/275.4 |

FOREIGN PATENT DOCUMENTS

JP        1-113913        2/1989

OTHER PUBLICATIONS

"Nikkei Electronics", No. 586, written by Ishida & Watanabe; p. 169–181; Jul. 19, 1993.

* cited by examiner

*Primary Examiner*—David Hudspeth
*Assistant Examiner*—K. Wong
(74) *Attorney, Agent, or Firm*—Greer, Burns & Crain Ltd.

(57) ABSTRACT

A magnetic recording medium having a magnetic layer includes a plurality of tracks formed on the magnetic layer. The tracks have information magnetically recorded thereon. A magnetization change area for tracking control is formed on the magnetic layer adjacent to and along a length of each of the tracks. The magnetization change area has magnetic flux which changes along the length of the tracks.

14 Claims, 19 Drawing Sheets

MAGNETIC RECORDING MEDIUM HAVING TRACKING CONTROL AREA FORMED ADJACENT DATA TRACKS

BACKGROUND OF THE INVENTION

The present invention relates to a magnetic recording medium which is capable of recording/reproducing information magnetically and a magnetic head apparatus for recording/reproduction and, more specifically, relates to a magnetic recording medium on which track information as one kind of auxiliary information is recorded and a magnetic head apparatus.

On a magnetic disk, at first auxiliary information is written. The auxiliary information is information, which is necessary for recording/reproducing information on/from a magnetic disk, such as track information for locating on a track of a magnetic head, address information for managing a recording position of information, PLL clock information for reading out an address, and the like. A servo writer is known as an apparatus for writing such auxiliary information on a magnetic disk.

In the servo writer, a guide pin which received an instruction from a locating control circuit pushes out a magnetic head so as to determine a position on the disk, and the magnetic head so as to determine a position on the disk, and the magnetic head records auxiliary information given from an auxiliary data preparation circuit. Such servo writer has problems such that a long time is required for writing track information on a magnetic disk, the servo writer is expensive, and the whole of a servo writer apparatus must be installed in a clean room environment.

In order to solve these problems, there is suggested a magnetic disk to which a technique of an optical disk is applied (NIKKEI ELECTRONICS Jul. 19, 1993 (No. 586) p. p. 169–181). The magnetic disk magnetically reproduces a pit formed on the disk surface so as to obtain auxiliary information. The magnetic disk is formed so that a substrate having spiral or coaxially circular grooves is coated with a magnetic film, and pits corresponding to auxiliary information are previously formed on tracks of the substrate. When the auxiliary information is recorded, the magnetic head is moved in a radial direction in an area where the pits are formed, and applies a strong magnetic field so that convex portions and concave portions are magnetized in an identical direction. Next, while the magnetic head is being moved in the same direction in the same area, the magnetic head applies a weak magnetic field having a direction opposite to that of the strong magnetic field so that only the magnetization of the convex portions is inverted. Since the concave and convex areas on the tracks are magnetized respectively in opposite directions, the auxiliary information which was recorded by the pits can be read out by magnetically reproducing it from the tracks. The grooves are formed in order to prevent fracturing of the reproducing signal due to a leakage of magnetic field between tracks.

When the pits are formed on the magnetic disk according to the track information and the magnetization is executed as mentioned above, the auxiliary information can be easily recorded on the magnetic disk, and thus the servo writer is not required. However, since the pit groups formed according to the auxiliary information are formed with intervals on the tracks, an error in reading a tracking error signal becomes great when a disk rotational number is increased or a track pitch is short.

BRIEF SUMMARY OF THE INVENTION

The present invention is achieved with such points in view, and its one object is to provide a magnetic recording medium, in which magnetization changes areas where magnetic flux is changed along the length of tracks are provided so that track information can be recorded easily, and even if a track pitch is narrow, an error in reading the track information does not occur. Moreover, its object is to provide a magnetic recording medium in which groove sections with a non-uniform width along the length of tracks are provided respectively on both sides of the track so that track information can be recorded easily, and an error in reading track information does not occur.

In addition it is another object of the invention to provide a magnetic head apparatus for controlling tracking of a magnetic recording medium using magnetization change areas whose magnetic flux changes, and further to provide a magnetic head apparatus for controlling tracking of a magnetic recording medium having grooves with identical widths.

A magnetic recording medium of the invention is characterized by including: tracks formed on the magnetic layer, along which information is recorded magnetically; and magnetization change areas for tracking control formed on the magnetic layer, from which a change in magnetic flux along the length of the tracks can be read out.

Since the magnetization change areas where the magnetic flux changes along the length of the tracks are provided, the change in magnetic flux is obtained from the magnetization change areas on both sides of the tracks, and these outputs are differentially detected so that the tracking control can be executed. Therefore, track information can be recorded easily on a magnetic disk and can be reproduced accurately.

In addition, a magnetic recording medium of the invention is characterized by including: tracks formed on the magnetic layer, along which information is recorded magnetically; and groove sections for tracking control formed on the magnetic layer, each of said groove sections having a width non-uniform along the length of the tracks and being magnetization change area which is magnetized in a direction opposite to a magnetization direction of the tracks.

Since each of the groove sections has a width non-uniform in the direction along the tracks, when the groove sections are provided on both sides of the tracks, the magnetic flux changes on both sides of the tracks. The changes in magnetic flux on both groove sections are obtained as track information and the changes are subtracted so that the tracking control can be executed. As a result, the track information can be recorded on the magnetic disk easily and reproduced accurately.

Further, the magnetic recording medium of the invention is characterized in that the magnetization change areas are non-magnetic areas whose width is non-uniform along the length of the tracks.

Therefore, the changes in magnetic flux on both the sides of the magnetic areas (tracks) between the non-magnetic areas are obtained as the track information, and the changes are subtracted so that the tracking control can be executed. Accordingly, the track information can be recorded on the magnetic disk easily and reproduced accurately.

Furthermore, the magnetic recording medium of the invention is characterized in that the magnetization change areas which are adjacent to each other have respective widths where change rates are different from each other.

Therefore, since the change rates of the widths of the groove sections formed on both sides of the track are different from each other, even when the track information of both the groove sections are read out by one magnetic head, for example, the track information of the respective groove sections can be obtained through filters according to frequencies of the change rates. As a result, the tracking control can be executed by differentially detecting the track information. In such a manner, the track information can be recorded easily and reproduced accurately.

A magnetic head apparatus of the present invention is characterized by including: a reproduction head section for detecting the change in magnetic flux; and a differential circuit for obtaining a differential signal between outputs detected by the reproduction head section from the magnetization change areas on both sides of the track.

Therefore, the magnetic flux which changes along the length of the tracks is detected by the reproduction head section, and outputs are obtained from the magnetization change areas on both sides of the tracks, and the tracking control is executed so that the output on one side has a value identical to a value of the output on the other side.

In addition, the magnetic head apparatus of the invention is characterized in that the reproduction head sections are arranged on both sides along the length of the tracks.

Therefore, the tracking control is executed in such a manner that the two reproduction head sections detect the changes in magnetic flux on both sides of the track, and the respective outputs are compared so that they have an identical value.

The magnetic head apparatus of the invention is characterized by further including filter circuits connected to the reproduction head sections for obtaining respective outputs corresponding to the adjacent magnetization change areas so as to give a differential signal therebetween to the differential circuit.

Since the changes in magnetic flux are different on both sides of the tracks, when the changes are inputted to the filter circuits according to frequencies of the respective changes, the outputs detected by the magnetic head apparatus can be divided to the respective sides of the tracks, and the tracking control is executed by the differential circuit.

A magnetic head apparatus of the invention for reproduction-use of a magnetic recording medium in which groove sections are formed on both sides of tracks along which the information is recorded, is characterized by including: a reproduction head section for detecting a change in magnetic flux; displacement elements for displacing the reproduction head section in crossing direction of the tracks; and a differential circuit for obtaining a differential signal between outputs corresponding to two displaced positions of the reproduction head section.

Therefore, by means of the reproduction head section, magnetic output signals of three patterns, which are obtained when the reproduction head section is at the center and are on both sides of the center, are obtained. Since the tracking control is executed so that the output signals which are obtained when the reproduction head section is displaced to both the sides have values identical to each other, the track information can be recorded on the magnetic recording medium easily.

In addition, the magnetic head apparatus of the invention is characterized in that the displacement elements are electrostrictive elements, the differential circuit has a first holding circuit for holding a signal amplitude in a first position of the reproduction head section, a second holding circuit for holding a signal amplitude in a second position, and a comparison circuit for comparing the signal amplitudes of the first and second holding circuits, and the magnetic head apparatus is capable of moving the crossing direction of the tracks in accordance with the compared result.

The signal amplitude, which is obtained when the reproduction head section is displaced to one side, is held by the first holding circuit, and the signal amplitude, which is obtained when the reproduction head section is displaced to the other side, is held by the second holding circuit. These signal amplitudes are compared, and the tracking control is executed so that the signal amplitudes have values identical to each other. As a result, the track information can be recorded on the magnetic recording medium easily.

The above and further objects and features of the invention will more fully be apparent from the following detailed description with accompanying drawings.

DETAILED DESCRIPTION OF THE INVENTION

There will be detailed below the preferred embodiments of the present invention with reference to the drawings.

First Embodiment

Figure 1:
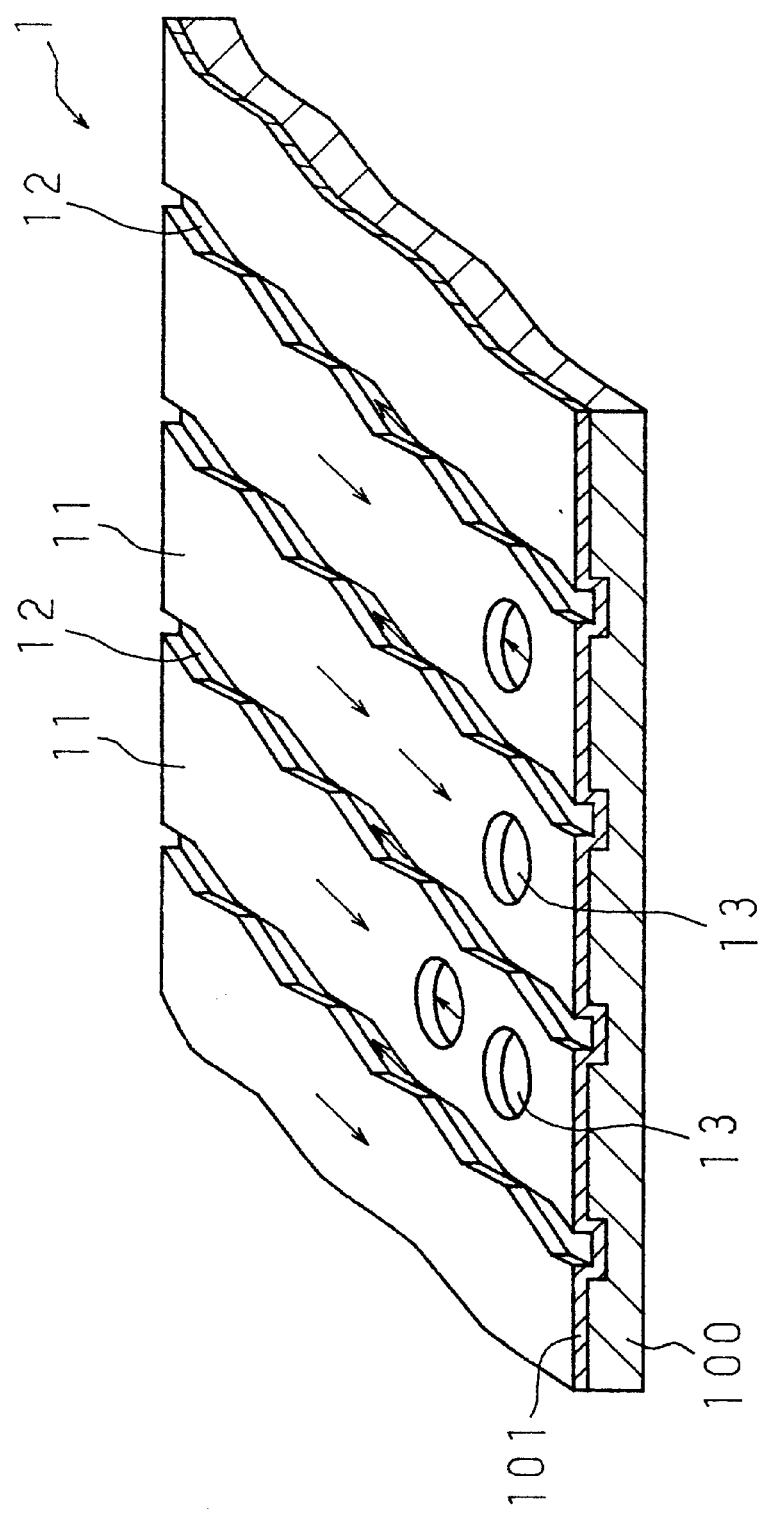
FIG. 1 is a perspective view showing a structure of a magnetic disk according to a first embodiment of the present invention.

FIG. 1 is a perspective view, with portions broken away, of a structure of a magnetic disk according to a first embodiment of the present invention. A magnetic disk 1 is configured so that a magnetic film 101 is laminated on a surface of a substrate 100 made of polycarbonate resin. The substrate 100 is formed with groove sections 12 (magnetization change areas) having a spiral or coaxially circular shape about a central portion of the disk. Tracks 11 for data recording are formed between the groove sections 12. The groove section 12 has a non-uniform width which is different along the length of the tracks (hereinafter, referred to as a track direction). A change from a minimum width portion to a maximum width portion is linear, and the minimum width portion and the maximum width portion are formed alternatively and periodically. This frequency is lower than a frequency of data to be recorded on the tracks 11. Pits 13 corresponding to address information are formed on the tracks 11.

The magnetic disk 1 having the above structure is subject to initial magnetization. As for the initial magnetization, at first a comparatively strong magnetic field is applied so that the magnetic disk 1 is magnetized in its one direction, and a magnetic field weaker than the above magnetic field is applied in the opposite direction. As mentioned above, according to this magnetization, the tracks 11 and both of the groove sections 12 and the pits 13 are magnetized in the directions opposite to each other. Here, when the magnetic fields are applied, a magnet which is longer than a diameter of the magnetic disk 1 is used so that the whole surface of the disk can be magnetized by scanning once.

Figures 2A, 2B, 2C:
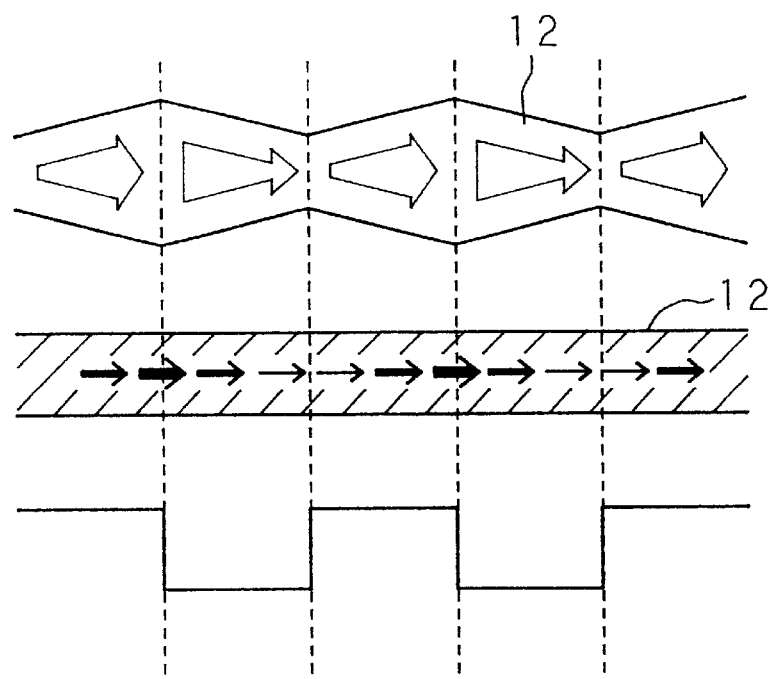
FIGS. 2A through 2C are drawings showing a magnetization state and a magnetic reproduction waveform in groove sections of FIG. 1.

On the magnetic disk 1 which underwent the initial magnetization, auxiliary information such as track information and address information are recorded. There will be described below reproduction of the auxiliary information. FIG. 2 is a drawing showing a magnetization state and reproduction waveform of the groove sections 12 of the magnetic disk 1. FIG. 2A is a plan view showing the magnetization state of the groove sections 12, and increase and decrease of magnetic flux is represented by widths of white arrows. FIG. 2B is a sectional view showing the magnetization state of the groove sections 12, and a magnetization amount is represented by widths of arrows. FIG. 2C is a reproduction waveform of the groove sections 12. As shown in the drawings, when the magnetic flux is increased, the magnetic flux penetrates from a circumference, and thus a reproduction output becomes high. When the magnetic flux is decreased, the magnetic flux goes out, and thus the production output becomes high. When the magnetic flux is decreased, the magnetic flux goes out, and thus the reproduction output becomes low.

Figure 3:
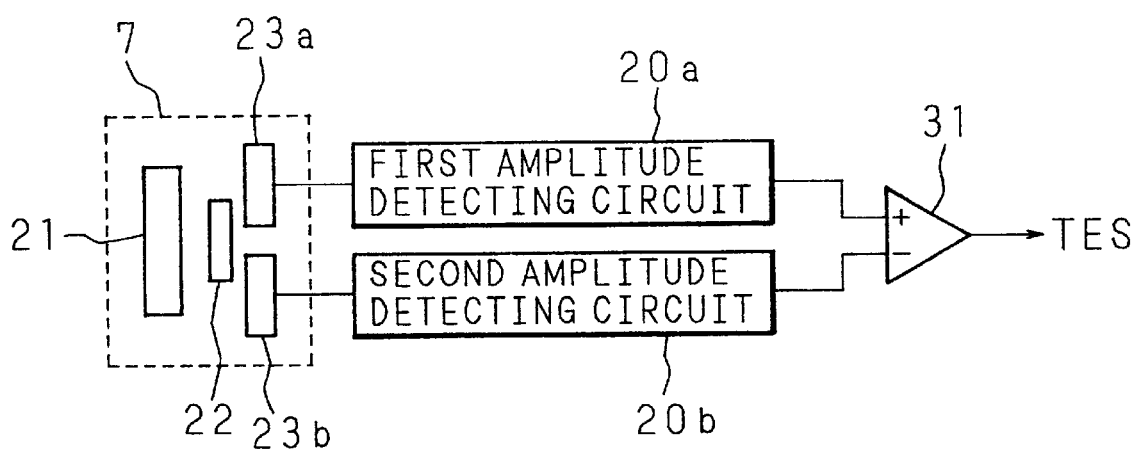
FIG. 3 is a constitutional drawing partially showing a magnetic head apparatus and tracking control circuit according to the first embodiment.

FIG. 3 is a schematic drawing showing a structure of a magnetic head and tracking control circuit to be used when data is recorded/reproduced on/from the magnetic disk 1. As shown in the drawing, a magnetic head 7 has a recording head 21 for recording data, a reproduction head 22 for reproducing the recorded data and address information, and two servo heads 23a and 23b for reproducing the track information so as to execute tracking control. The magnetic head 7 can be moved up and down and right and left by an actuator, not shown. The reproduction head 22 and the servo heads 23a and 23b use a MR (Magnetic Resistance) head or GMR head.

Figure 4A:
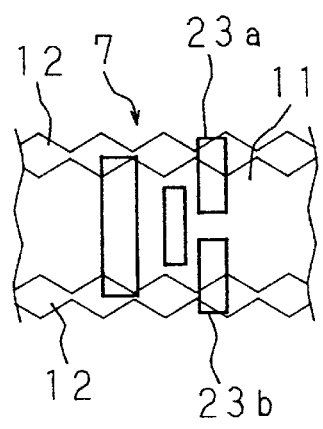
FIGS. 4A through 4C are drawings explaining the tracking control by means of the magnetic head apparatus of FIG. 3.
Figure 4B:
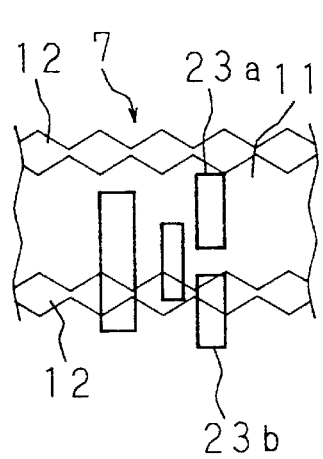
Figure 4C:
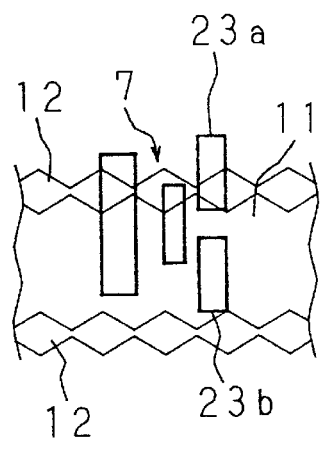

The two servo heads 23a and 23b respectively reproduce track information from the groove sections 12 on both sides of the track 11, and first and second amplitude detecting circuits 20a and 20b detect amplitudes of reproduced signals and give the signals to a differential device 31 so that a tracking error signal (TES) is obtained. FIG. 4 is a drawing explaining the tracking control. FIG. 4A shows a case that the magnetic head 7 is at the center of the track 11, and in this case, the TES becomes zero. FIG. 4B shows a case that the magnetic head 7 is shifted to one side of the track 11, and FIG. 4C shows a case that the magnetic head 7 is shifted to the other side. In these cases, the TES is outputted as a positive or negative value. Therefore, the tracking control is executed by controlling the position of the magnetic head 7 so that the TES becomes zero. Moreover, the reproduction head 22 obtains a magnetic output from the pits, and reproduces auxiliary information such as address information. Further, data are reproduced by the reproduction head 22.

Figure 5:
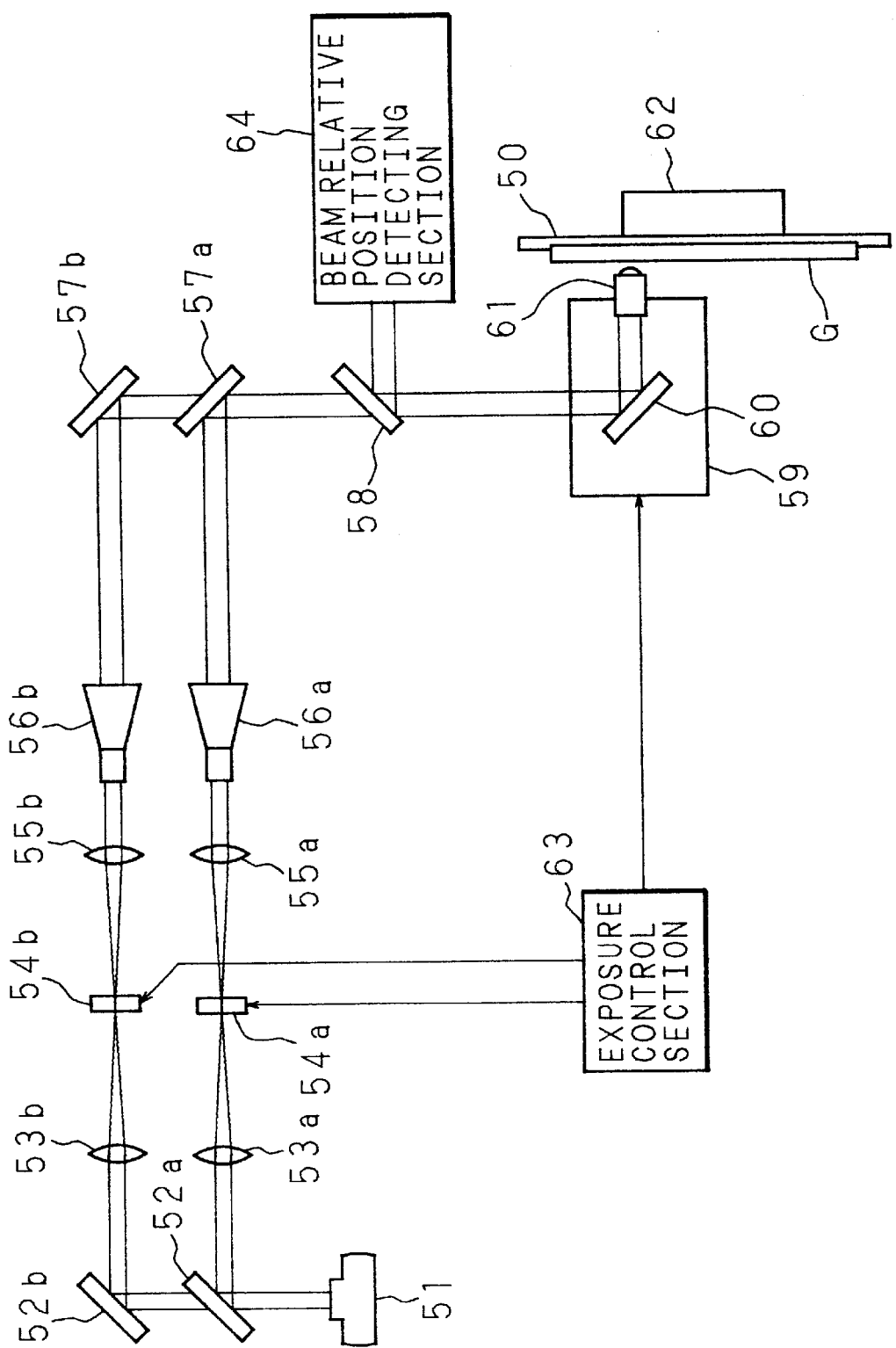
FIG. 5 is a constitutional drawing of an apparatus for producing the magnetic disk according to the first embodiment.

The following will describe a method of producing the magnetic disk 1 of the above-mentioned type. FIG. 5 is a constitutional drawing of a producing apparatus of the magnetic disk 1, and it has a beam exposure apparatus. The substrate 100 of the magnetic disk 1 is obtained by injection molding a glass matrix where groove sections and pits are formed. The ground glass matrix G is clad with photo-resist of 200 nm by a spin coating method, and it undergoes a pre-baking process at 90° C. for 30 minutes. The glass matrix G is then placed on a sample pedestal 50 having a spindle motor 62.

In the drawing, 51 is an Ar laser light source. A beam light emitted from the light source 51 is transmitted through and reflected from a half mirror 52a so that a spectrum is observed. At first, a first beam light reflected from the half mirror 52a enters a first condenser 53a. A light condensed on the first condenser 53a enters a first AOM (acousto-optic modulator) 54a so that its light intensity is modulated. The first AOM 54a and a second AOM 54b, mentioned later, modulate intensity of a light beam and controls an exposure power by means of an exposure control section 63. The light whose intensity was modulated enters the first collimating lens 55a and is returned to a parallel light so as to enter a first beam expander 56a. A beam diameter is enlarged in the first beam expander 56a, and the light is reflected from a half mirror 57a so as to enter a half mirror 58. The first collimating lens 55a and a second collimating lens 55b, mentioned later, are constituted so as to be capable of moving to a direction intersecting perpendicularly to an optical axis. Beam relative position detecting section 64 detects a relative position between the first beam light and a second beam light, mentioned later, and the relative position is controlled by the movement of the first collimating lens 55a and a second collimating lens 55b.

On the other hand, the second beam light transmitted through the half mirror 52a enters a mirror 52b, and follows the route identical to the first beam light. Namely, the light which was reflected from the mirror 52b and entered a second condenser 53b, is condensed thereon and enters the second AOM 54b so that the light intensity is modulated. The light whose light intensity was modulated enters the second collimating lens 55b, and returns to a parallel light thereon so as to enter a second beam expander 56b. A beam diameter is enlarged in the second beam expander 56b, and the light is reflected from a mirror 57b and transmitted through the half mirror 57a so as to enter the half mirror 58.

The first and second beam lights transmitted through the half mirror 58 enter an optical head 59 while the relative position therebetween controlled by the collimating lenses 55a and 55b is being maintained. The optical head 59 has a dichroic mirror 60 and an objective lens 61, and is constituted so as to be capable of moving in a direction perpendicular to or parallel with the sample pedestal 50. The first and second beam lights are reflected from the dichroic mirror 60 and condensed on the glass matrix G via the objective lens 61. Focusing to the glass matrix G is controlled by the movement of the optical head 59 in the above-mentioned perpendicular direction. A beam light, which has a wavelength of 780 nm such that the photo-resist of the glass matrix G is not exposed, is emitted to the glass matrix G, and the optical head 59 is moved to the perpendicular direction according to a focusing error signal generated by the reflected light so that the focus control is executed.

The first beam light in the beam exposure apparatus having the above structure forms grooves with a non-uniform width, and the second beam light forms pits. The width of the grooves varies according to the intensity of the first beam light. For example, in the case where a positive-type resist is used, when the intensity is increased, the width becomes wider, and when the intensity is decreased, the width becomes narrower. The width of the grooves can be changed at a predetermined change rate by setting a modulating degree of the intensity. Here, the magnetic disk 1 according to the present embodiment can be produced also by emitting one beam light. In this case, a feed amount of the beam light in a radial direction at the time of exposure is set to be very small, and one groove is exposed to light with several periods.

The glad matrix G which was exposed to light in such a manner is spin-developed and dried. Thereafter, Ni of 0.2 $\mu$m is deposited on the glass matrix G by a vacuum metallizer, and an electrode for plating is formed. Thereafter, the Ni is plated so as to have a thickness of 0.3 mm by an electrolytic plating method. After the Ni is peeled from the glass matrix G and an inner periphery and outer periphery are processed into a dimension of a stamper of molder, the substrate 100 made of polycarbonate is created by the injection molding. $SiO_2$ of 30 mm, Cr of 15 mm, $Ni_3P$ of 26 mm, $SiO_2$ of 15 mm and carbon of 8 mm are formed on that substrate 100 by sputtering so that the magnetic disk 1 is produced.

As mentioned above, on the magnetic disk 1 according to the first embodiment, the track information is recorded easily by means of the groove section 12 whose width is not uniform in the track direction, and thus even if the track pitch is narrow, an error in reading the tracking error signal does not occur.

Second Embodiment

Figure 6:
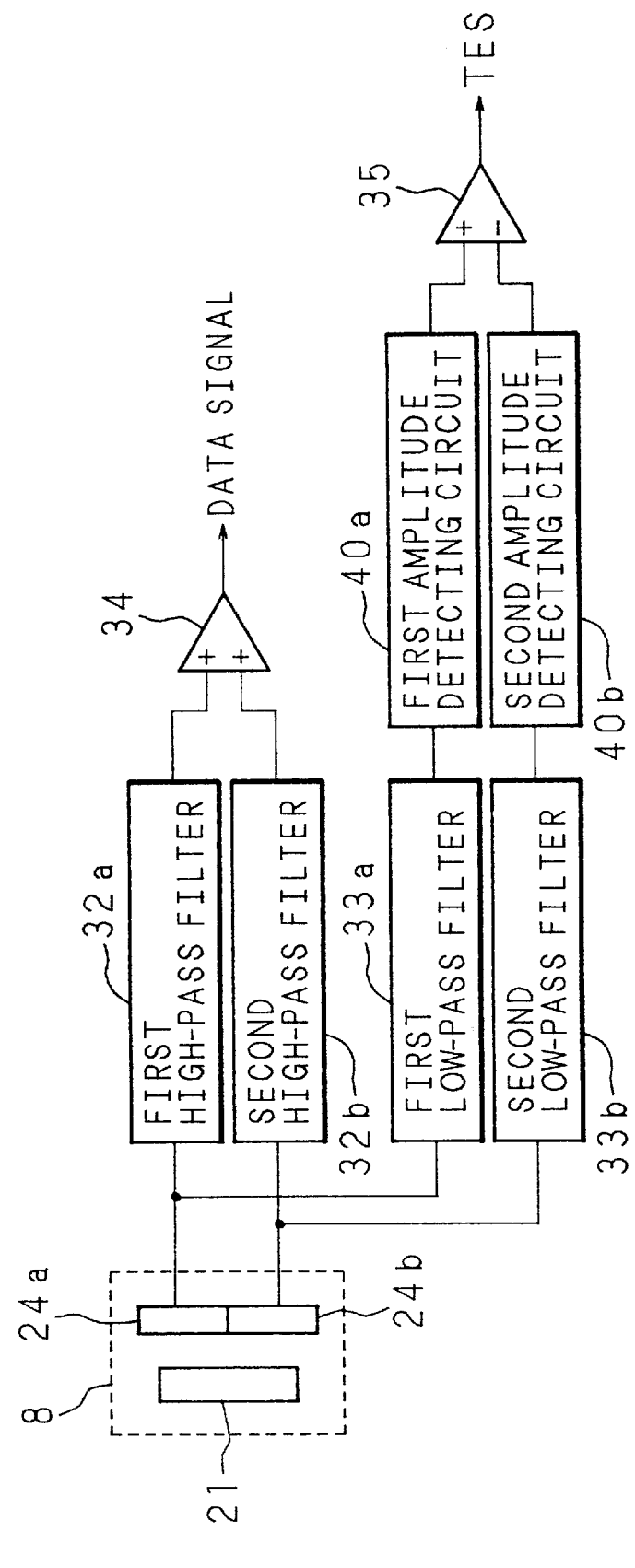
FIG. 6 is a constitutional drawing partially showing the magnetic head apparatus and tracking control circuit according to a second embodiment.

FIG. 6 is a constitutional drawing showing another structure of a recording and reproduction head 8 for reproducing the auxiliary information from the magnetic disk 1 shown in FIG. 1, the tracking control circuit and data reproduction circuit. As shown in the drawing, the magnetic head 8 has a recording head 21 for recording data, and two reproduction heads 24a and 24b for reproducing the recorded data and auxiliary information. An output of the first reproduction head 24a is given to a first high-pass filter 32a and a first low-pass filter 33a, and an output of the second reproduction head 24b is given to a second high-pass filter 32b and a second low-pass filter 33b. As a result, these outputs are classified into an output of the data and an output of the track information. Output signals from the first and second high-pass filters 32a and 32b are added to each other by an adder 34 so that a data signal is outputted. On the other hand, output signals from the first and second low-pass filters 33a and 33b are given respectively to first and second amplitude detecting circuits 40a and 40b, and the signals are subtracted by a differential device 35 so that a tracking error signal (TES) is outputted.

Even if the recording and reproduction head 8 having the reproduction heads 24a and 24b, which are commonly used for the tracking control and data reproduction, is used, the track information on the magnetic disk of the present invention can be produced.

Third Embodiment

Figure 7:
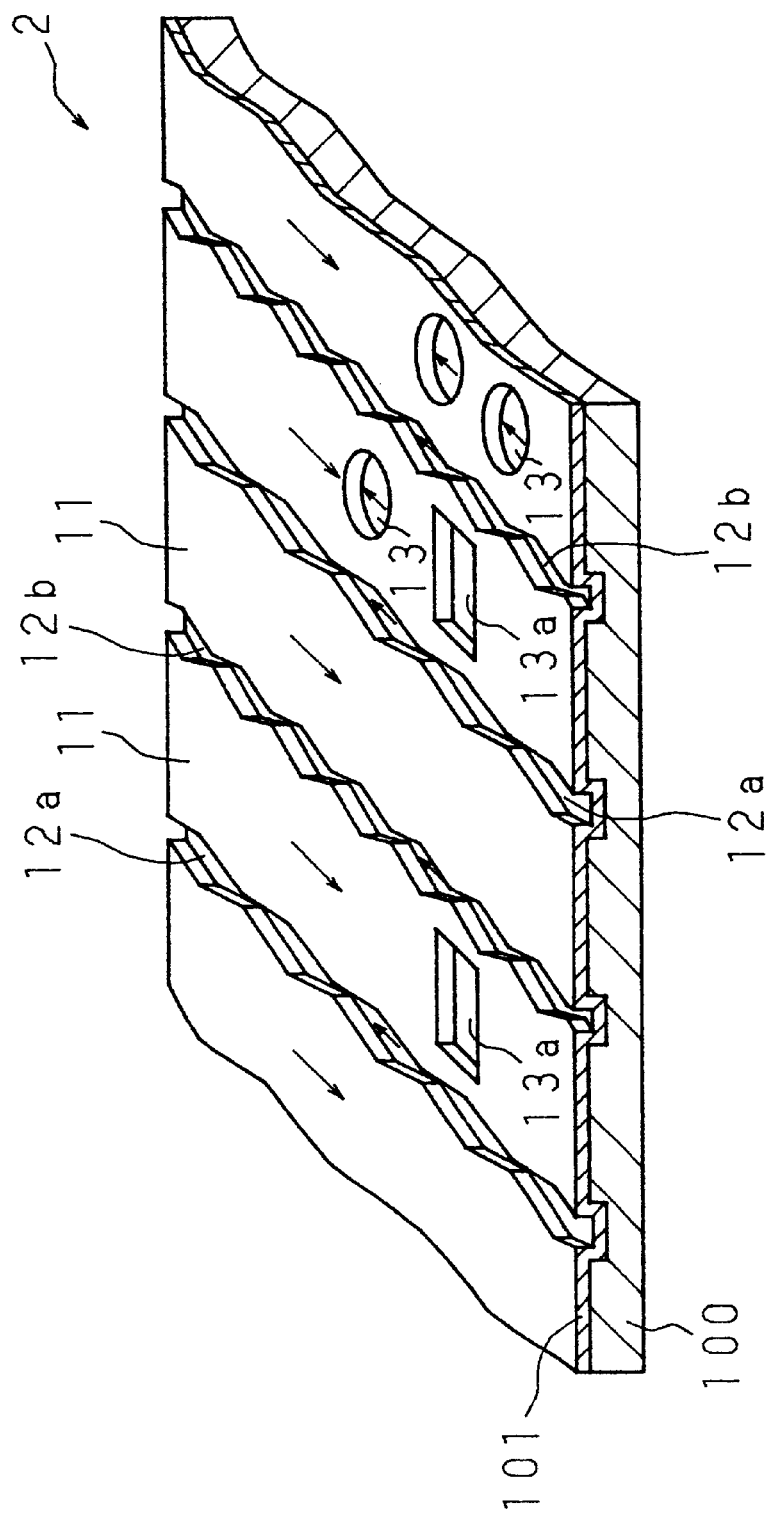
FIG. 7 is a perspective view showing a structure of the magnetic disk according to a third embodiment.

FIG. 7 is a perspective view of the structure of the magnetic disk according to the third embodiment, with parts broken away and in section. A magnetic disk 2 is constituted so that the magnetic film 101 is laminated on the surface of the substrate 100 made of polycarbonate resin. On the substrate 100, first and second groove sections 12a and 12b (magnetization change area) are alternatively formed per periphery into a spiral or coaxially circular shape about the center of the disk. The track 11 for recording data is formed between the groove sections 12a and 12b. The groove sections 12a and 12b have a non-uniform width different in the track direction, and a change from the minimum width portion to the maximum width portion is linear, and the maximum width portion and minimum width portion are formed alternatively and periodically. This frequency is lower than a frequency of the data to be recorded on the tracks 11, and the first groove sections 12a and second groove sections 12b have different frequencies. A pit 13 corresponding to the address information and a track discriminating pit 13a for discriminating odd-numbered or even-numbered tracks are formed on the tracks 11. The other structure and producing methods are identical to those of the magnetic disk 1 of FIG. 1, and the description thereof is omitted.

Figure 8:
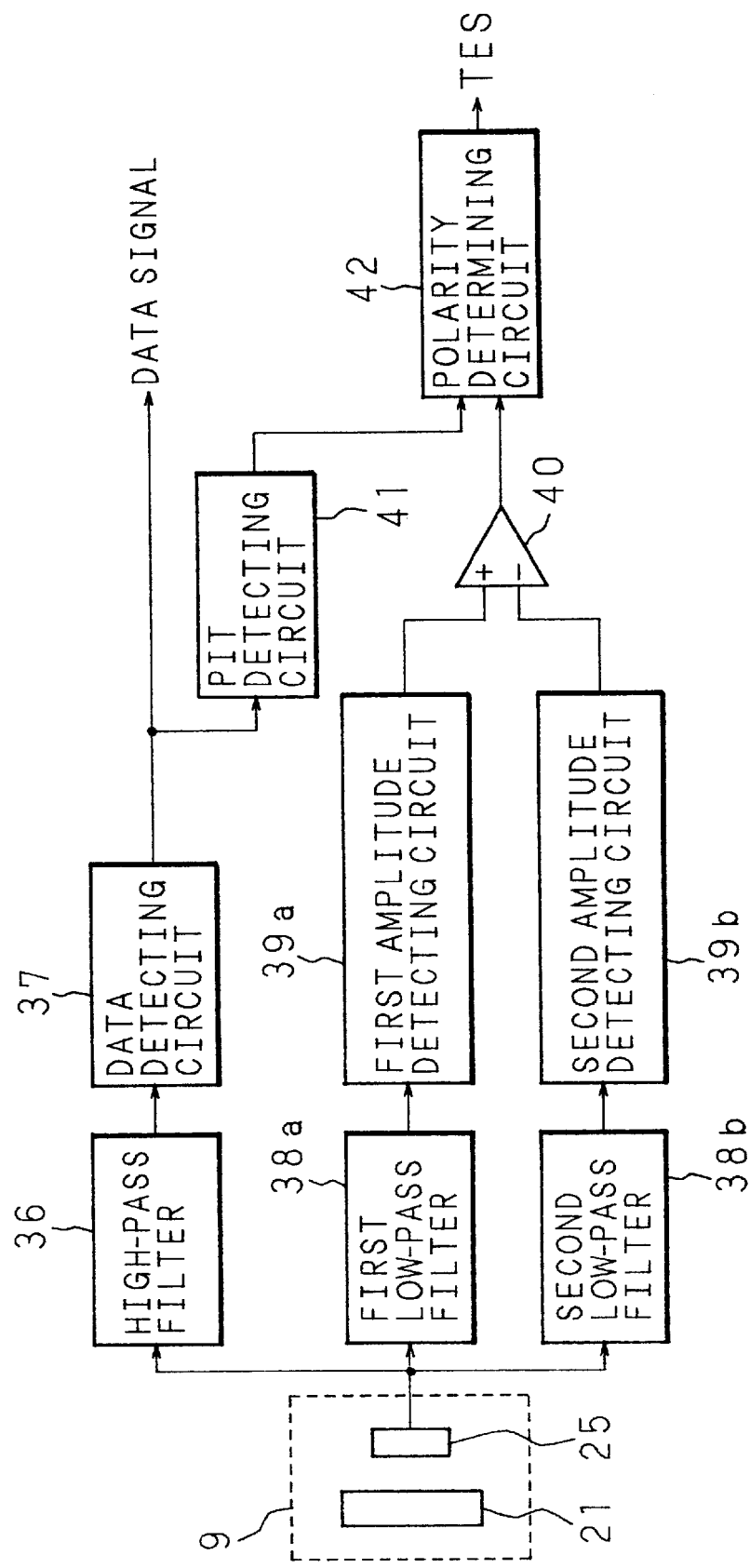
FIG. 8 is a constitutional drawing partially showing the magnetic head apparatus and tracking control circuit according to the third embodiment.

FIG. 8 is a constitutional drawing showing a structure of another recording and reproduction head 9 for reproducing the auxiliary information from the magnetic disk 2, a tracking control circuit and data reproduction circuit. As shown in the drawing, the magnetic head 9 has the recording head 21 for recording data, and a reproduction head 25 for reproducing the recorded data and auxiliary information. An output of the reproduction head 25 is given to a high-pass filter 36, a first low-pass filter 38a and a second low-pass filter 38b, and they are classified into an output of the data and an output of the track information.

An output signal from the high-pass filter 36 is given to a data detecting circuit 37 so that a data signal is outputted. At the same time, the data signal is inputted into a pit detecting circuit 41 for track discrimination so that a detection is made as to whether a reproduction track is odd-numbered or even-numbered track. On the other hand, output signals from the first and second low-pass filters 38a and 38b are inputted respectively into first and second amplitude detecting circuits 39a and 39b, and are subtracted by a differential device 40 and the subtracted signal is inputted into a polarity determining circuit 42. In the polarity determining circuit 42, a detected signal from the pit detecting circuit 41 is inputted and polarity of the output signal from the differential device 40 is determined according to existence or non-existence of the discrimination pit 13a. In the present embodiment, since the two groove sections 12a and 12b and the both sides of the track 11 have different frequencies, the positive/negative of the output from the differential device 40 cannot correspond to the moving direction of the magnetic head. However, the detection of the discrimination pit 13a can allow positive/negative of the output from the polarity determining circuit 42 to correspond to the moving direction of the magnetic head. The tracking control is executed by moving the magnetic head 9 so that the output signal (TES) of the polarity determining circuit 42 becomes zero.

As mentioned above, on the magnetic disk 2 according to the third embodiment, the track information is recorded easily by means of the first and second groove sections 12a and 12b, which have non-uniform width in the track direction, and even if the track pitch is narrow, the error in reading the tracking error signal does not occur.

Figure 9:
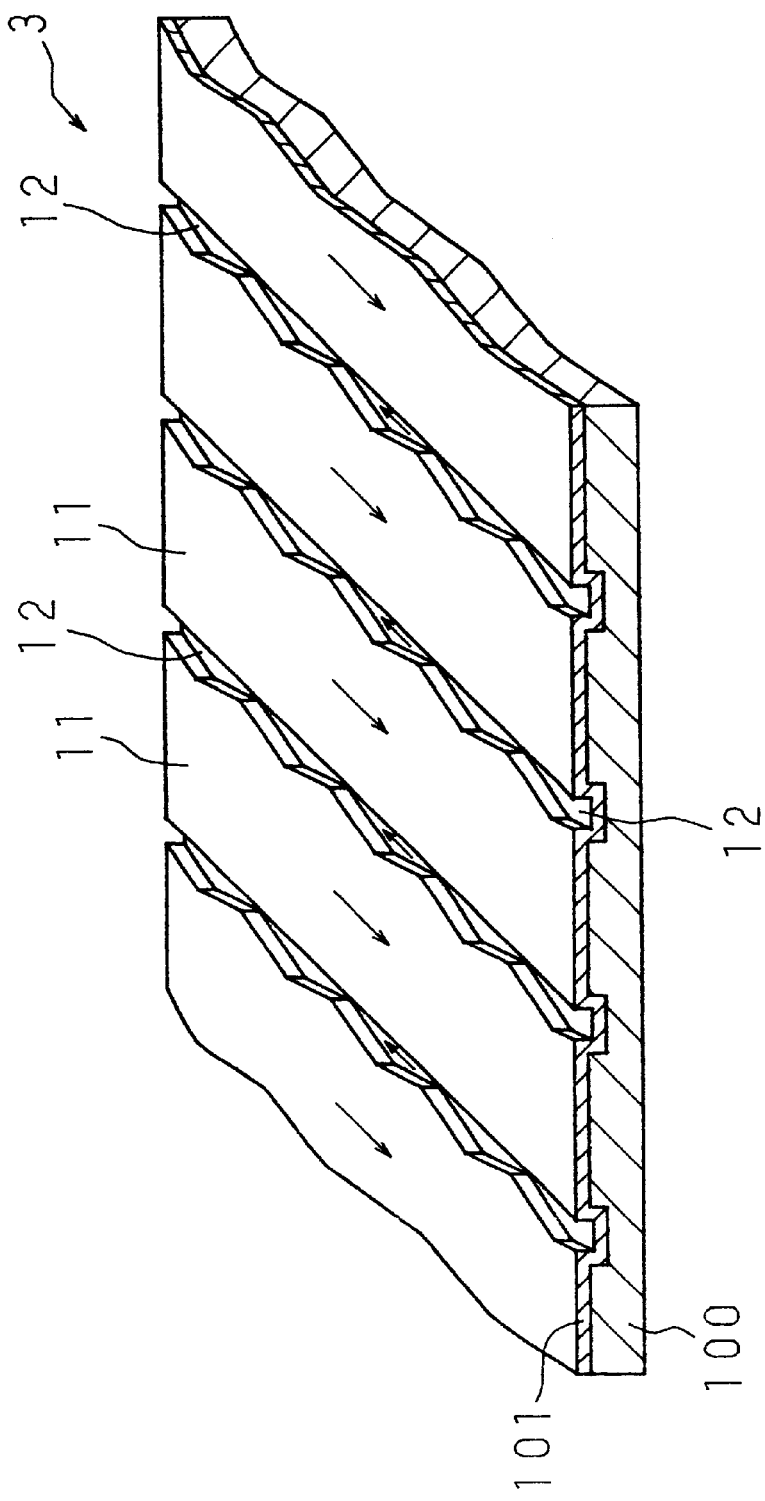
FIG. 9 is a perspective view showing another structure of the magnetic disk according to the present invention.
Figure 10:
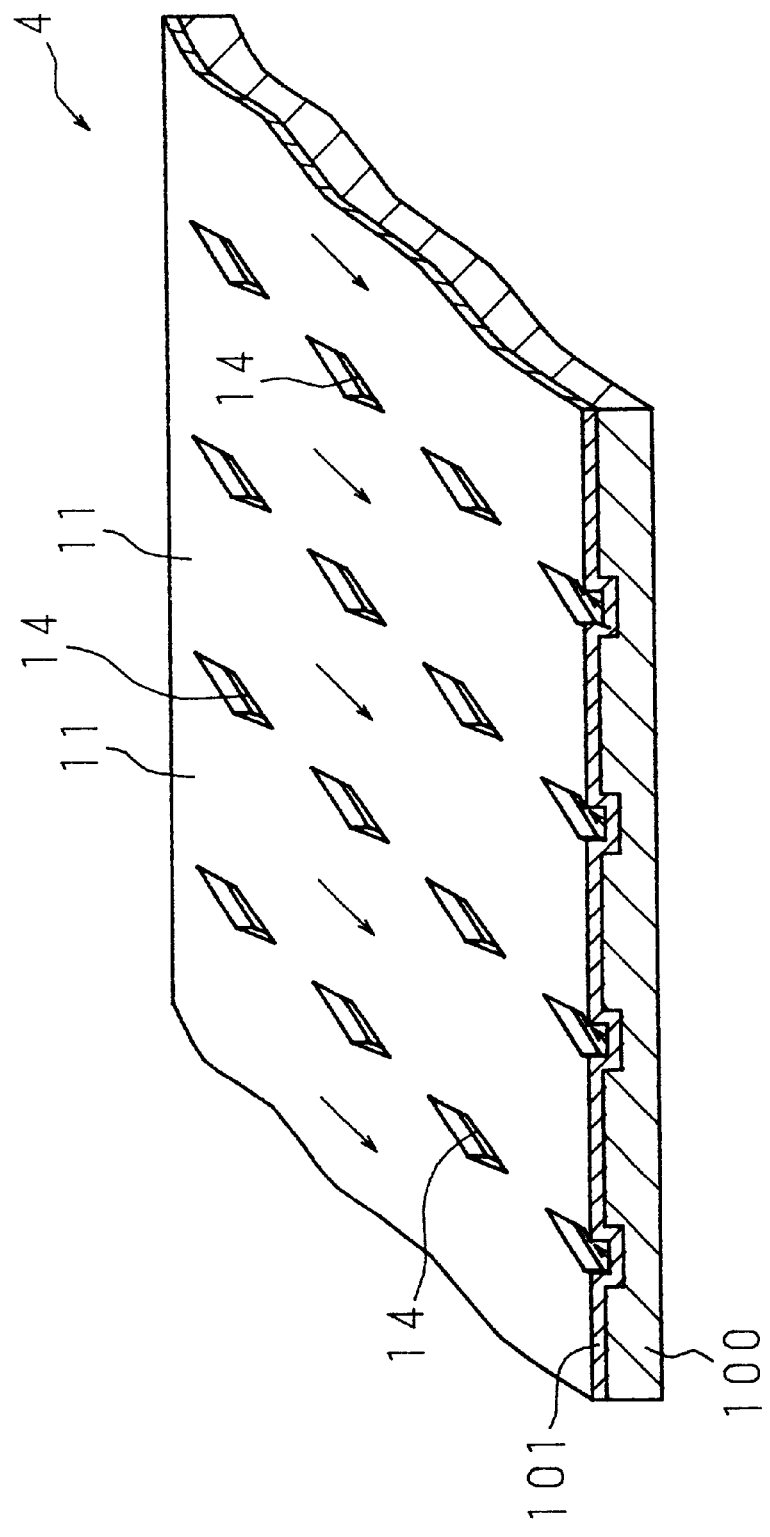
FIG. 10 is a perspective view showing still another structure of the magnetic disk according to the present invention.

FIGS. 9 and 10 are perspective views of structures of another magnetic disks of the present invention, with parts broken away and in section. In FIG. 9, the groove sections 12 provided on a magnetic disk 3 have a non-uniform width in the track direction, and only one side wall is formed into a serrated shape. Moreover, in FIG. 10, tracking-use pits 14, 14 having a substantially lozenge form viewed in plan view are formed in the track direction at uniform pitches in a spiral or coaxially circular area about the center of the disk. As for the magnetic disks 3 and 4 shown in FIGS. 9 and 10, their producing method and method of reproducing the track information are identical to those in the aforementioned embodiments, and the description thereof is omitted. On the magnetic disks 3 and 4, the track information is recorded easily, and even if the track pitch is narrow, the error in reading the tracking error signal does not occur.

Here, the aforementioned first through third embodiments described the case where the width of the groove sections changes linearly, but the present invention is not limited to this. Therefore, a structure where the width of the groove sections change curvedly shows the same effect.

Fourth Embodiment

The above-mentioned embodiments described the magnetic disk on which the track information is recorded, but the fourth embodiment will describe a magnetic head for reading the track information from a magnetic disk having an area where magnetization is not changed, and the method of reproducing the track information.

Figure 11:
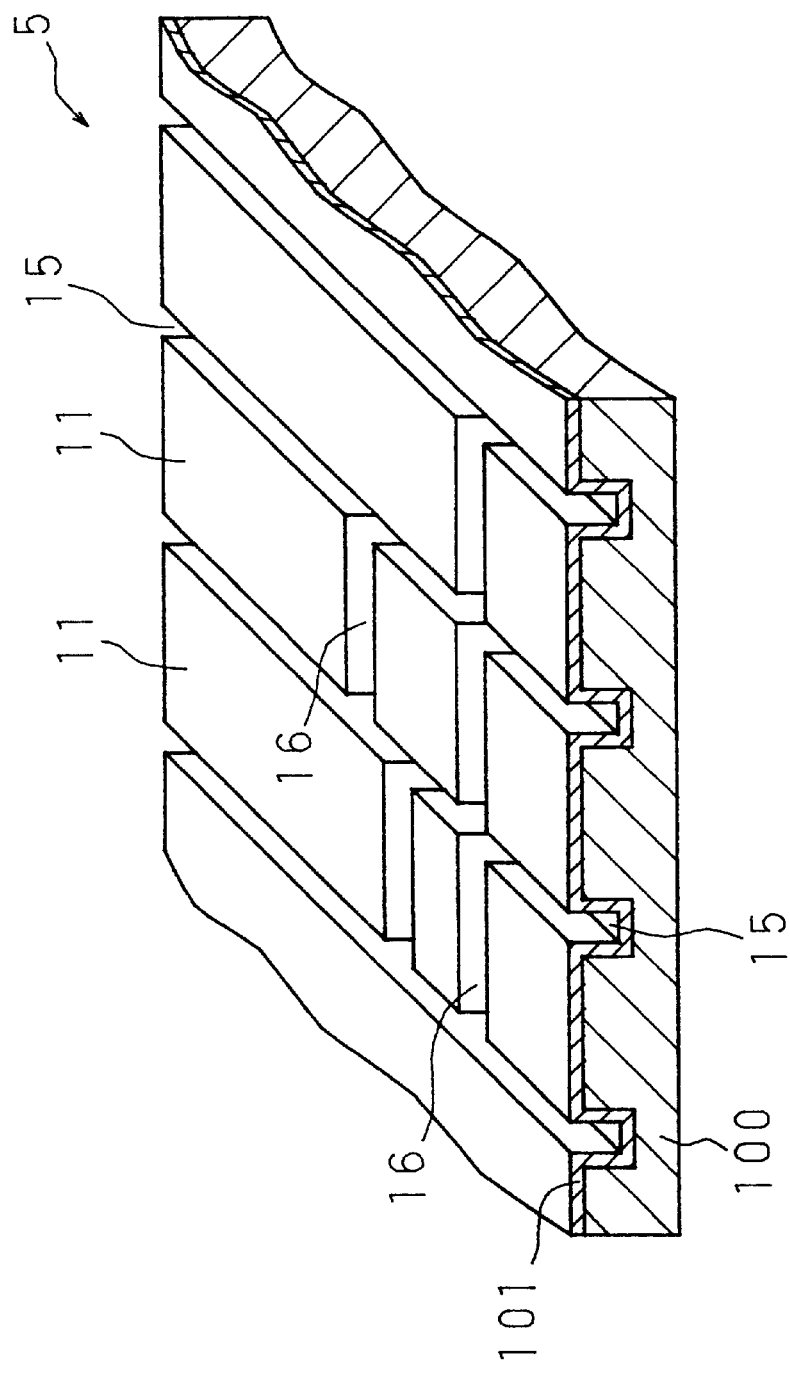
FIG. 11 is a perspective view showing a structure of the magnetic disk according to a fourth embodiment.

FIG. 11 is a perspective view of a structure of a magnetic disk used in the fourth embodiment, with parts broken away and in section. A magnetic disk 5 is constituted so that the magnetic film 101 is laminated on the surface of the substrate 100 made of a polycarbonate resin. The substrate 100 is provided with groove sections 15 (magnetization change area) having a spiral or coaxially circular shape about the center of the disk. The tracks 11 for data recording are formed between the groove sections 15. The groove sections 15 have an uniform width, and a depth such that magnetic recording is not executed by a recording-use magnetic field. Pits 16 corresponding to the address information are formed on the tracks 11. In the magnetic disk 5, initial magnetization is given thereto similarly to the first through third embodiments, and the tracks 11, groove sections 15 and the pits are magnetized in opposite directions.

Figure 12:
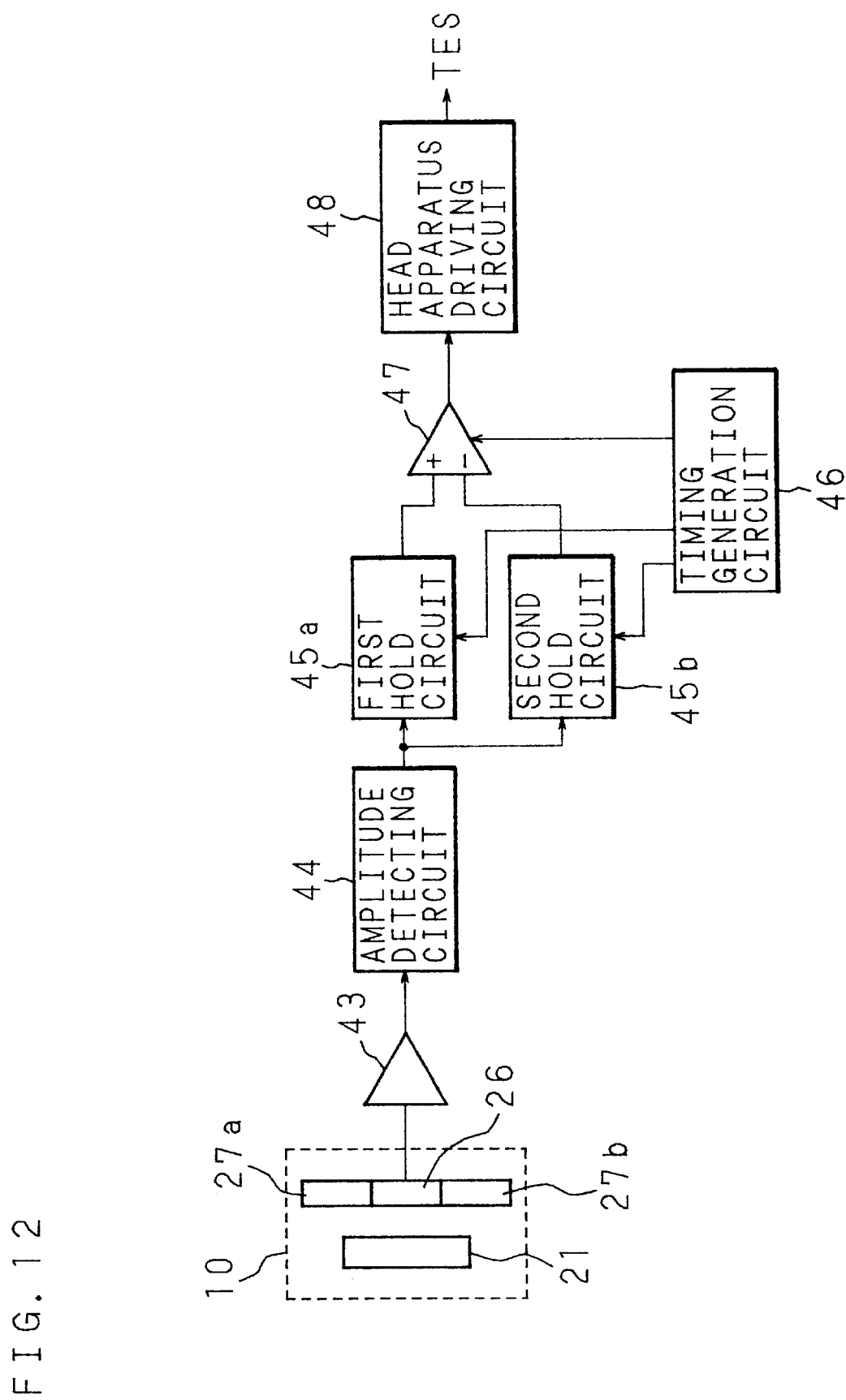
FIG. 12 is a constitutional drawing partially showing the magnetic head apparatus and tracking control circuit according to the fourth embodiment.

FIG. 12 is a constitutional drawing showing the structure of the magnetic head, and a tracking error signal (TES) reproduction circuit according to the fourth embodiment. A magnetic head 10 has the recording head 21 for recording data, and a reproduction head 26 for reproducing the data, address information and track information. Electrostrictive elements 27a and 27b for displacing the reproduction head 26 quickly are mounted to both sides of the reproduction head 26. The electrostrictive elements 27a and 27b are displacement elements which can be expanded and contracted by electrical control, and lamination-type piezo elements, for example, are used. The magnetic head 10 can be moved up and down and right and left by an actuator, not shown. The reproduction magnetic head 26 is moved by the displacement of the electrostrictive elements 27a and 27b, and the recording head 21 and reproduction head 26 are moved together by the displacement of the magnetic head 10.

A signal from the reproduction head 26 is inputted into an amplifier 43 and outputted to an amplitude detecting circuit 44. An output from the amplitude detecting circuit 44 is inputted into a first hold circuit 45a and second hold circuit 45b, and a signal from a timing generation circuit 46 is outputted to the first and second hold circuits 45a and 45b and a differential device 47. Output signals from the first and second hold circuits 45a and 45b are inputted into the differential device 47, and a differential signal is given to a head apparatus driving circuit 48 so that the magnetic head 10 is moved.

Figure 13:
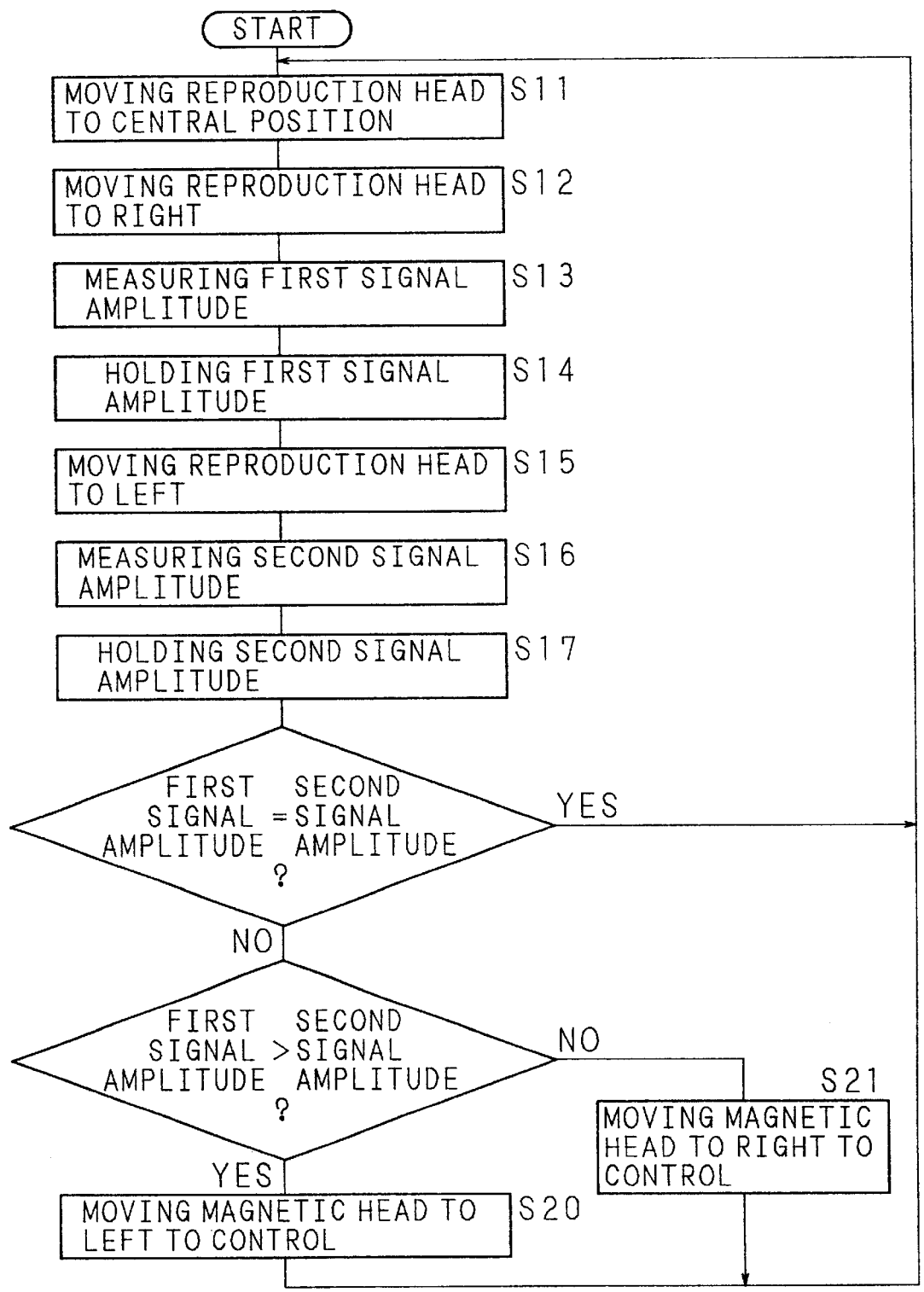
FIG. 13 is a flow chart showing steps of tracking control according to the fourth embodiment.
Figure 14:
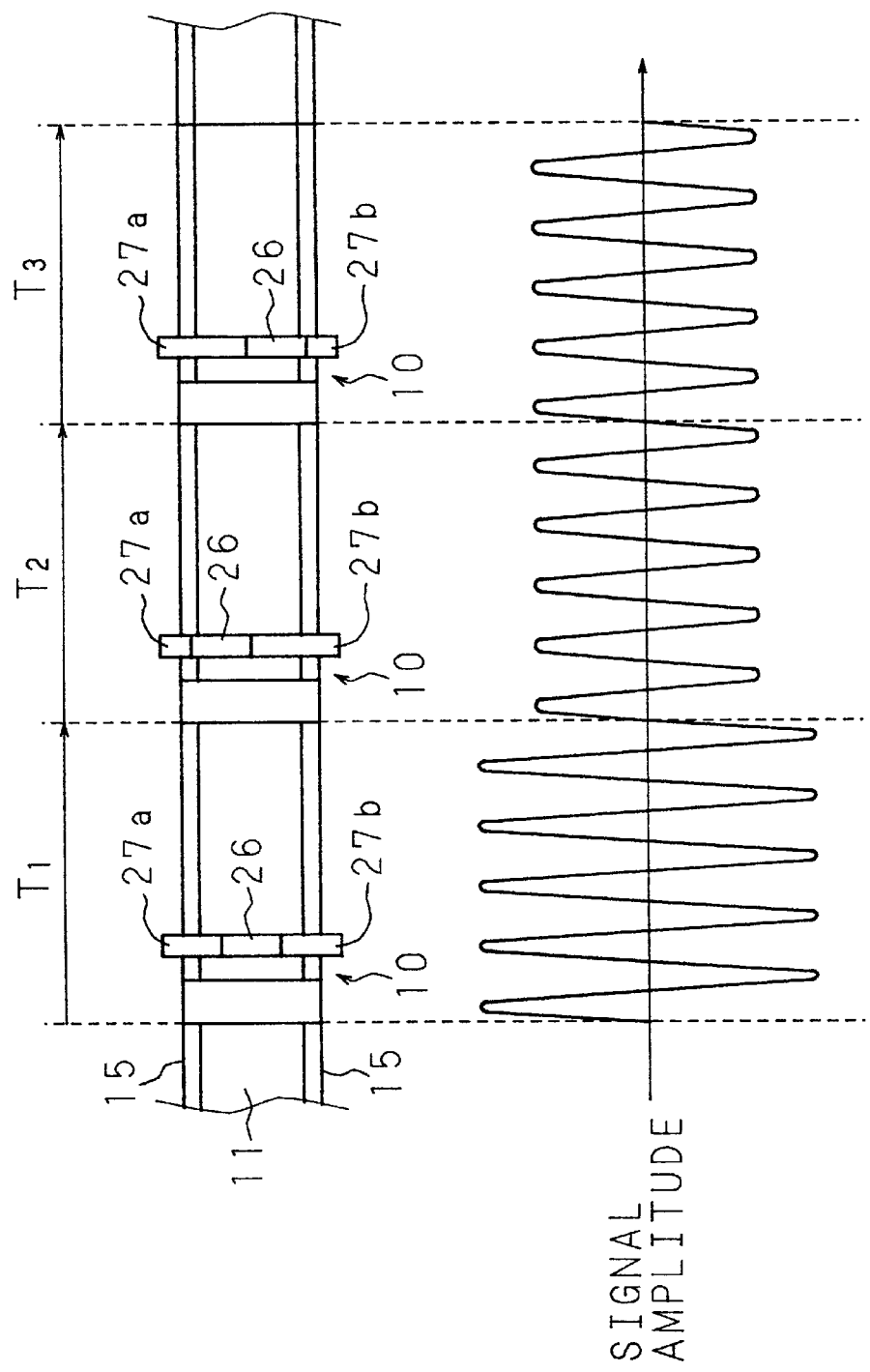
FIG. 14 is a drawing explaining a first pattern of the tracking control according to the fourth embodiment.
Figure 15:
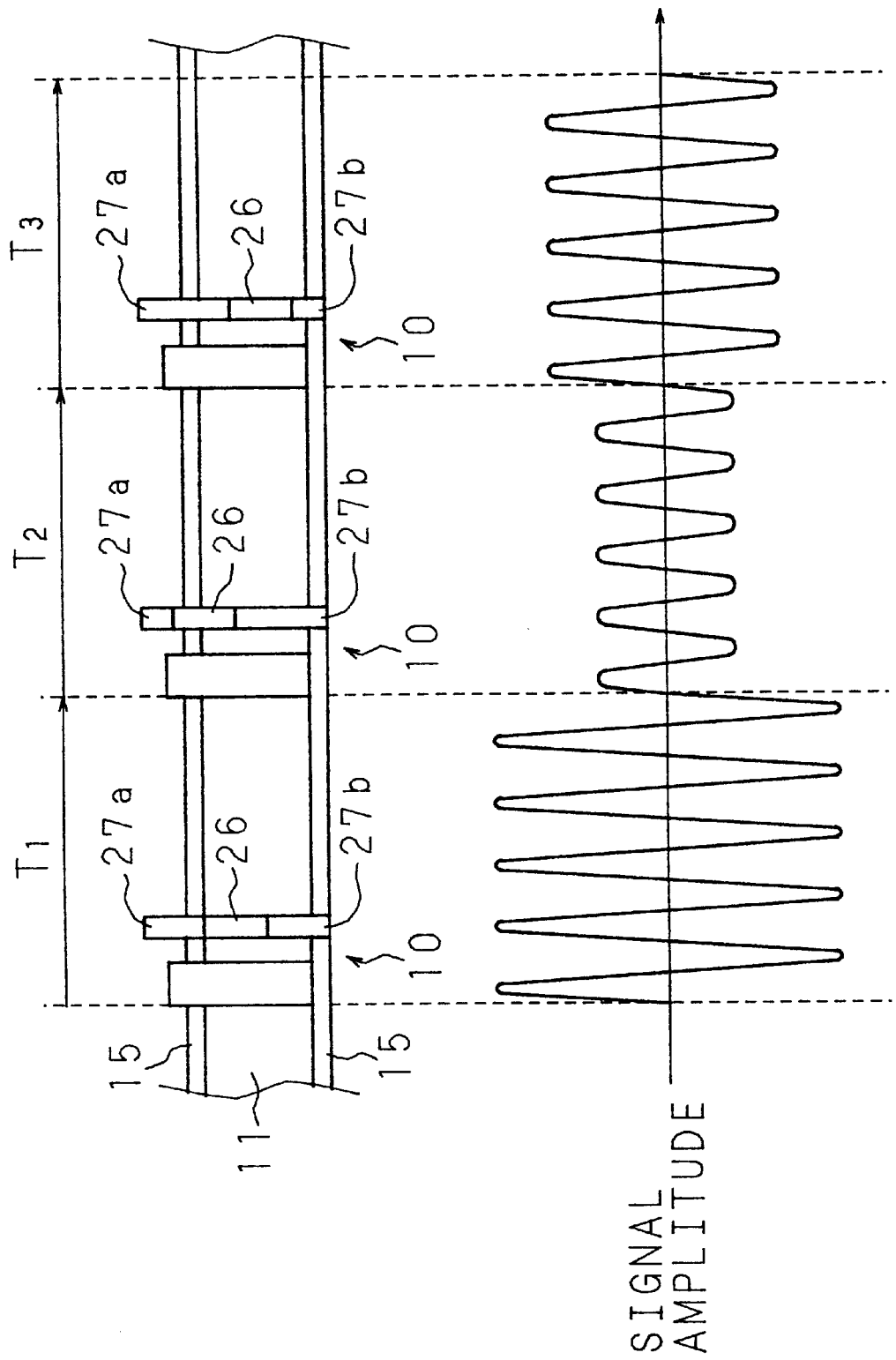
FIG. 15 is a drawing explaining a second pattern of the tracking control according to the fourth embodiment.
Figure 16:
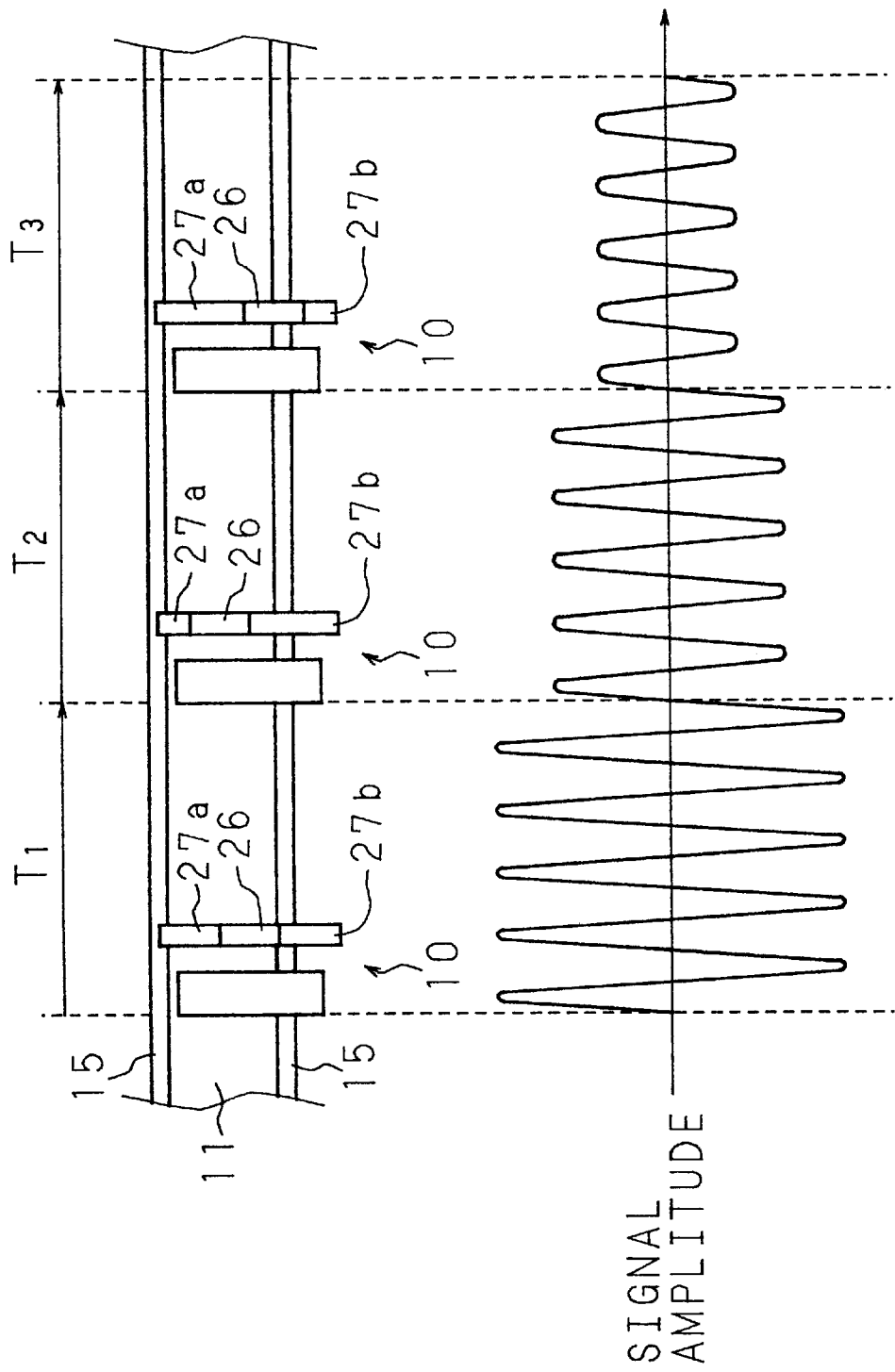
FIG. 16 is a drawing explaining a third pattern of the tracking control according to the fourth embodiment.

The following will describe a method of executing the tracking control of the magnetic disk 5 using the above-mentioned magnetic head and reproduction circuit. FIG. 13 is a flow chart showing steps of tracking control of the magnetic disk 5. FIGS. 14 through 16 are drawings for explaining respective patterns of the tracking control. As shown in FIG. 13, the reproduction head 26 is moved to the central position by the electrostrictive elements 27a and 27b for a period $T_1$ (Step S11). A voltage is applied to the electrostrictive elements 27a and 27b so that the reproduction head 26 is moved to the right side for a period $T_2$ (step S12), and a first signal amplitude is measured by the amplitude detecting circuit 44 (step S13). The first signal amplitude is held by the first hold circuit 45a (step S14). The reproduction head 26 is moved to the left side by the electrostrictive elements 27a and 27b for a period $T_3$ (step S15), and a second signal amplitude is measured (step S16). The second signal amplitude is held by the second hold circuit 45b (step S17). Subtraction is executed as for the first signal amplitude and second signal amplitude by the differential device 47 so that a detection is made as to whether they have an identical value or which amplitude has a larger value (step S18, step S19).

FIG. 14 is a drawing explaining a case where the first signal amplitude and second signal amplitude have an identical value. In this case, since the signal amplitudes for the period $T_1$ and period $T_2$ are identical to each other, the magnetic head 10 is judged as being at the center of the track 11, and thus the magnetic head 10 is not moved. FIG. 15 is a drawing explaining a case where the first signal amplitude has a smaller value than the second signal amplitude. In this case, the magnetic head 10 is moved to the right side (step S21) so that the first signal amplitude and second signal amplitude have an identical value. Moreover, FIG. 16 is a drawing explaining a case where the first signal amplitude has a larger value than the second signal amplitude. In this case, the magnetic head 10 is moved to the left side (step S20) so that the first signal amplitude and second signal amplitude have an identical value.

In such a manner, when the amplitude signals, which are obtained by moving the reproduction head 26 to the central position, right side position and left side position, are compared with each other, the position of the reproduction head 26 with respect to the tracks 11 is detected so that the tracking control can be executed. For a clear description, the description is given as to a case where a moving amount of the reproduction head 26 in the track direction is large, but actually the moving amount may be set to a value such that a difference in the amplitudes can be detected. Therefore, the reproduction of data is not prevented. As mentioned above, in the magnetic head 10 according to the third embodiment, the track information can be read easily from the magnetic disk, and the tracking control can be executed accurately.

Fifth Embodiment

Figure 17:
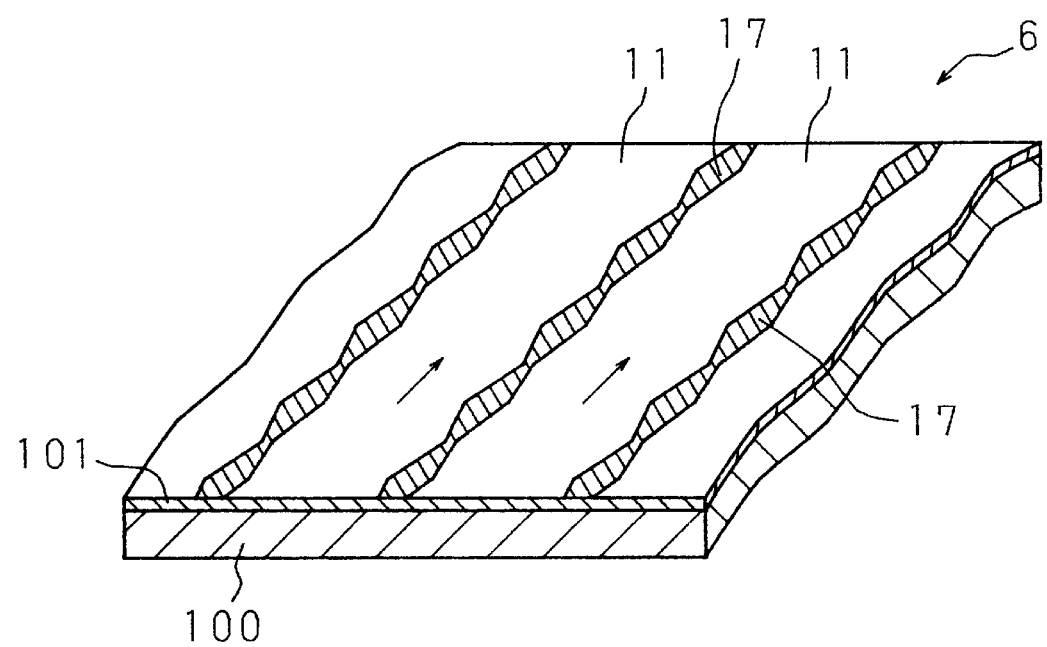
FIG. 17 is a perspective view showing a structure of the magnetic disk according to a fifth embodiment.

FIG. 17 is a perspective view of a structure of a magnetic disk according to the fifth embodiment, with parts broken away and in section. A magnetic disk 6 is constituted so that the magnetic film 101 is laminated on the surface of the substrate 100 made of a polycarbonate resin where pits (not shown) are formed on its predetermined positions. Non-magnetic areas 17 are formed about the center of the disk into a spiral or coaxially circular shape. Magnetic areas (tracks 11) are formed between the non-magnetic areas 17. The tracks 11 and non-magnetic areas 17 have a non-uniform width different in the track direction, and a change from a minimum width portion to a maximum width portion is linear, and the maximum width portions and the minimum width portions are formed alternatively and periodically. This frequency is lower than a frequency of data to be recorded on the tracks 11.

In the method of forming such non-magnetic areas 17, a mask is placed on the tracks 11 of the magnetic film 101 of the magnetic disk 6, and the mask is exposed by an exposure power of 20 mW/μm so that it contacts closely with the magnetic film 101. When areas which are not covered with the mask is exposed, its magnetic property disappears, and the non-magnetic areas 17 are formed. Thereafter, a magnetic field is applied to the surface of the magnetic disk 6 so that the tracks 11 are magnetized in one direction.

Figure 18:
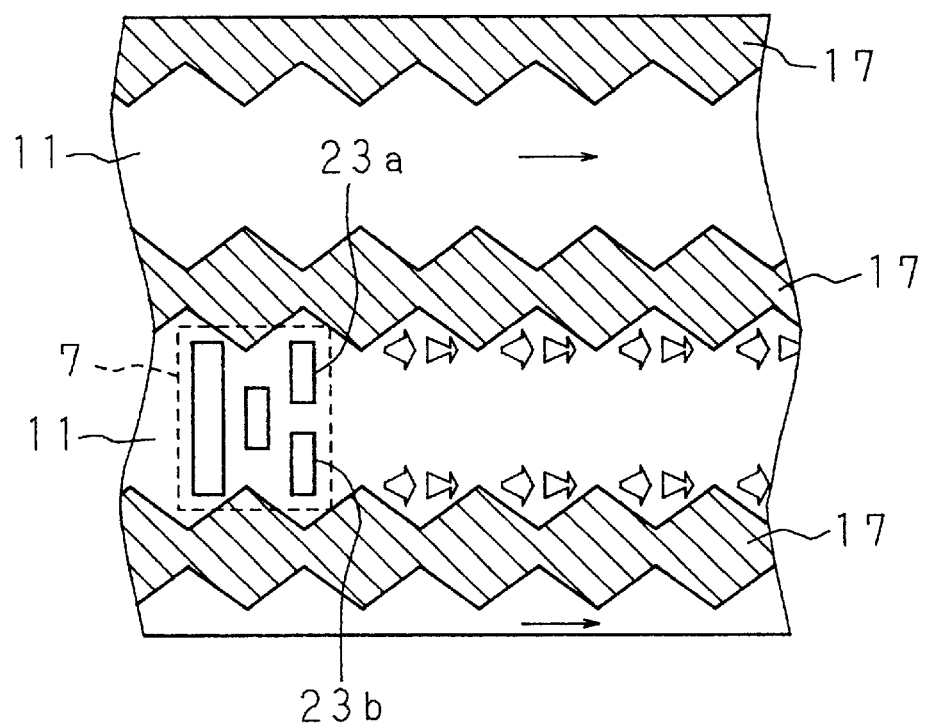
FIG. 18 is a plan view explaining the tracking control of the magnetic disk of FIG. 17.

FIG. 18 is a plan view showing a state of the tracking control of such magnetic disk 6 and a magnetic head. The magnetic head 7 has the structure identical to that shown in FIG. 3. When the tracking control is executed, the magnetic head 7 scans over the tracks 11 between the non-magnetic areas 17. The first and second servo heads 23a and 23b read respectively a change in magnetic flux on both sides of the track 11 (see FIG. 2) and output their differential signal TES, and execute the tracking control so that the TES becomes zero.

As mentioned above, on the magnetic disk 6 according to the fifth embodiment, the track information is recorded easily by the tracks (magnetization areas) 11 where the magnetic flux change in the track direction, and even if the track pitch is narrow, the error in reading the tracking error signal does not occur.

Here, the fifth embodiment described the case where the magnetic head 7 shown in FIG. 3 is used for executing the tracking control of the magnetic disk 6, but the present invention is not limited to this. Therefore, if the magnetic heads shown in FIGS. 6, 8 and 12 are used, the same effect can be obtained.

In addition, the fifth embodiment described the case where the magnetization areas are formed into a form that the magnetic flux changes linearly, but the present invention is not limited to this. Therefore, if they are formed into a form that the magnetic flux changes curvedly, the same effect can be obtained.

Further, the above first through third embodiments described the case where the substrate 100 made of polycarbonate is used, but the present invention is not limited to this. Therefore, if a glass 2P (photopolymer substrate) is used, the same effect can be obtained. Moreover, the method of producing these substrates referred to the case of the injection molding of matrix, but the present invention is not limited to this. Therefore, the substrates may be formed by mask exposure. There will be describe below the methods of producing the respective substrates.

In the case where the glass 2P substrate is produced, the substrate 100 can be obtained such that a form of the glass matrix G is transferred by using photopolymer from a stamper where groove sections and pits are formed. Grooves having a non-uniform width are formed on the ground glass matrix G by using the beam exposure apparatus having the arrangement shown in FIG. 5. Its steps are the same as those in the first embodiment, so the description thereof is omitted. The exposed glass matrix G is spin-developed and dried. Thereafter, Ni of 0.2 μm is deposited on the glass matrix G by a vacuum metallizer so that an electrode for plating is formed. Thereafter, the Ni is plated into a thickness of 0.3 mm by the electrolytic plating method. The Ni is peeled from the glass matrix G, and its inner periphery and outer periphery are processed so that it is used as a stamper. Photopolymer is applied to the surface of the Ni and a flat glass substrate is placed thereon. The photopolymer is spread uniformly so as to become thin, and is irradiated by an ultraviolet ray lamp so as to be hardened. Thereafter, the glass substrate and photopolymer are peeled from the stamper. In such a manner, the glass 2P substrate is produced.

Next, there will be described the steps of producing the substrate 100 by means of mask exposure. At first, a photo mask will be produced as follows. Chrome oxide of 100 nm is built up on a well-ground glass substrate by sputtering. Photo-resist of 200 nm is built up thereon by a spin coating method and is subject to a pre-baking process at 90° C. for 30 minutes. The glass substrate is placed on the sample pedestal 50 of the beam exposure apparatus shown in FIG. 5, and grooves are formed by the steps same as those in the first embodiment. Since these steps are the same as those in the first embodiment, the description thereof is omitted. The glass substrate exposed in such a manner is spin-developed and dried so that the photo mask is formed. Grooves having a non-uniform width are formed on the photo mask.

Figure 19A:
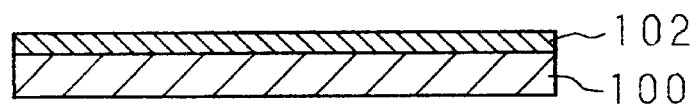
FIGS. 19A through 19E are sectional views showings steps of another producing method of the magnetic disk according to the first through third embodiments.
Figure 19B:
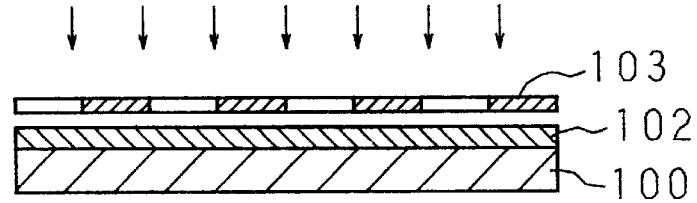
Figure 19C:
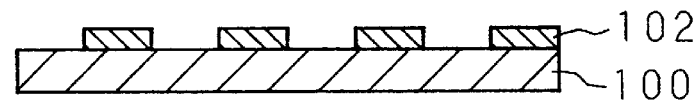
Figure 19D:
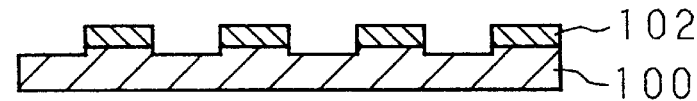
Figure 19E:

The photo mask 103 is mounted to the mask exposure apparatus. FIG. 19 is a sectional view showing the procedure of producing the substrate 100 by means of the mask exposure. As shown in FIG. 19A, photo-resist 102 is applied to a substrate 100 made of well-ground glass or silicon by the spin coating method, and is subject to the pre-baking process at 90° C. for 30 minutes. The substrate 100 to which the photo-resist 102 was applied is placed on the sample pedestal of the mask exposure apparatus, and it is covered with the photo mask 103 so as to be exposed collectively as shown in FIG. 19B. When the exposed substrate is spin-developed, the photo-resist 102 of portions shielded by the mask remain, and the substrate 100 is exposed from the exposed areas (see FIG. 19C). Next, as shown in FIG. 19D, when etching is executed by reactive ion etching, the areas from which the substrate 100 is exposed are etched so as to become grooves. Finally, as shown in FIG. 19E, the residual photo-resist is removed. In such a manner, the substrate 100, on which the grooves having a non-uniform width are formed, is produced.

As mentioned above, in the present invention, since the magnetization areas where the magnetic flux changes in the track direction are provided or the groove sections, which have a non-uniform width in the track direction, are provided, the track information can be obtained by magnetically reproducing the change in the magnetic flux. Therefore, the present invention shows the excellent effects such that the auxiliary information can be recorded easily on the magnetic recording medium, and the tracking control can be executed accurately.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A magnetic recording medium having a magnetic layer, comprising:
   a plurality of tracks formed on the magnetic layer, said tracks having information magnetically recorded thereon; and
   a magnetization change area for tracking control formed on said magnetic layer adjacent to and along a length of each of said tracks, each of said tracks having a non-uniform width, said magnetization change area having magnetic flux which changes continuously along any given portion of said length of said tracks.

2. A magnetic recording medium having a magnetic layer, comprising:
   a plurality of tracks formed on said magnetic layer, said tracks having information magnetically recorded thereon; and
   a groove section for tracking control formed on said magnetic layer adjacent to and along a length of each of said tracks, each of said groove sections having a nonuniform width which changes continuously along any given portion of said length of said tracks and being magnetized in a direction opposite to a magnetization direction of said tracks.

3. The magnetic recording medium according to claim 1, wherein said magnetization change areas are non-magnetic areas whose width is non-uniform along said length of said tracks.

4. The magnetic recording medium according to claim 2, wherein a magnetization of said groove sections changes with said width of said groove sections, and a rate of change of said magnetization of one of said groove sections adjacent a first side of a same one of said tracks is different from another one of said groove sections that is adjacent a second side of said same track.

5. A magnetic disk apparatus comprising:
   a magnetic recording medium having a magnetic layer;
   a plurality of tracks formed on said magnetic layer, said tracks having information magnetically recorded thereon,
   a magnetization change area for tracking control formed on said magnetic layer adjacent to and along a length of each of said tracks, each of said tracks having a non-uniform width, said magnetization change area having magnetic flux which changes continuously along any given portion of said length of said tracks;
   a reproduction head section for detecting said change in magnetic flux in said magnetization change areas along said tracks; and
   a differential circuit for obtaining a differential signal between outputs detected by said reproduction head section from said magnetization change areas on both sides of a select one of said tracks.

6. The magnetic disk apparatus according to claim 5, wherein said reproduction head section is adapted to be arranged on both sides along the length of said select one of said tracks.

7. The magnetic disk apparatus according to claim 5, wherein said magnetization changes areas of said magnetic recording medium are non-magnetic areas which have a width non-uniform along the length of said tracks.

8. The magnetic disk apparatus according to claim 7, wherein said reproduction head section are adapted to be arranged on both sides along the length of said tracks.

9. A magnetic disk apparatus comprising:
   a magnetic recording medium having a magnetic layer;
   a plurality of tracks formed on said magnetic layer, said tracks being adapted to have information recorded magnetically thereon;
   a groove section for tracking control formed on said magnetic layer adjacent to and along a length of each of said tracks, each of said groove sections having a non-uniform width that changes continuously along any given portion of the length of said tracks and being magnetized in a direction opposite to a magnetization direction of said tracks;
   a reproduction head section for detecting a change in magnetic flux in said grooves along said tracks; and
   a differential circuit for obtaining a differential signal between outputs detected by said reproduction head section from said grooves on both sides of a select one of said tracks.

10. The magnetic disk apparatus according to claim 9, wherein said reproduction head sections are adapted to be arranged on both sides along the length of said select one of said tracks.

11. The magnetic recording medium according to claim 9, wherein a magnetization of said groove sections changes with said width of said groove sections, and a rate of change of said magnetization of one of said groove sections adjacent a first side of a same one of said tracks is different from another one of said groove sections that is adjacent a second side of said same track.

12. The magnetic disk apparatus according to claim 9, further including a filter circuit connected to said reproduction head section for obtaining respective outputs corresponding to said grooves on both sides of said select one of said tracks so as to give a differential signal there between to said differential circuit.

13. A magnetic disk apparatus, comprising:
   a magnetic recording medium having a magnetic layer;
   a plurality of tracks formed on said magnetic layer, said tracks being adapted to have data recorded thereon;
   a magnetization change area for tracking control formed on said magnetic layer adjacent to and along a length of each said tracks, each of said tracks having a non-uniform width, said magnetization change area having which changes continuously along any given portion of said length of said tracks;
   a groove section being formed on both sides of each of said tracks;
   a recording head section for recording data on said tracks;
   a reproduction head section for detecting a change in magnetic flux in said groove sections;
   displacement elements for displacing said reproduction head section in a crossing direction of said tracks independently of said recording head section to a first position on a selected track for a first predetermined time period, and to a second position on a selected track for a second predetermined time period; and a differential circuit for obtaining a differential signal between outputs corresponding to said first and second positions of said reproduction head section.

14. The magnetic disk apparatus according to claim 13, wherein said displacement elements are electrostrictive elements, said differential circuit has a first holding circuit for holding a signal amplitude from said first position of said reproduction head section, a second holding circuit for holding a signal amplitude from said second position, and a comparison circuit for comparing the signal amplitudes of said first and said second holding circuits, and said reproduction head section is adapted to move in said crossing direction of said tracks in accordance with said compared signal amplitudes.

* * * * *

UNITED STATES PATENT AND TRADEMARK OFFICE
CERTIFICATE OF CORRECTION

PATENT NO. : 6,757,126 B1
DATED : June 29, 2004
INVENTOR(S) : Kuroda et al.

It is certified that error appears in the above-identified patent and that said Letters Patent is hereby corrected as shown below:

Column 14,
Line 53, after "area having" insert -- magnetic flux --.

Signed and Sealed this

Twenty-first Day of December, 2004

JON W. DUDAS
*Director of the United States Patent and Trademark Office*